United States Patent [19]
Lehmusto

[11] Patent Number: 5,809,018
[45] Date of Patent: Sep. 15, 1998

[54] GROUP CALL METHOD, A SYSTEM CONTROLLER AND A SUBSCRIBER STATION IN A RADIO SYSTEM

[75] Inventor: Mika Lehmusto, Espoo, Finland

[73] Assignee: Nokia Telecommunications Oy, Espoo, Finland

[21] Appl. No.: 525,781

[22] PCT Filed: Mar. 30, 1994

[86] PCT No.: PCT/FI94/00120

§ 371 Date: Jan. 3, 1996

§ 102(e) Date: Jan. 3, 1996

[87] PCT Pub. No.: WO94/23525

PCT Pub. Date: Oct. 13, 1994

[30] Foreign Application Priority Data

Mar. 30, 1993 [FI] Finland ................................ 931435

[51] Int. Cl.$^6$ ........................... H04Q 7/00; G08B 5/22
[52] U.S. Cl. .............. 370/330; 340/825.44; 340/825.36; 370/261; 370/384; 455/422
[58] Field of Search .................. 340/825.44, 825.36; 455/512, 422, 518, 31.2, 503, 450, 11.1, 414, 416, 519, 556, 557; 379/211, 67; 370/261, 384, 360, 337, 330, 340, 341

[56] References Cited

U.S. PATENT DOCUMENTS 5,117,501  5/1992  Childress et al. ...................... 455/11.1
5,404,571  4/1995  Makowski ................................ 370/330
5,465,391  11/1995  Toyryla ................................... 455/422

FOREIGN PATENT DOCUMENTS

93/05622  3/1993  WIPO .

OTHER PUBLICATIONS

Patent Abstracts of Japan, vol. 9, No. 154, E–325, Abstract of JP, A, 60–32441 (Nippon Denki K.K.), 19 Feb. 1985.

Primary Examiner—Wellington Chin
Assistant Examiner—Melissa Kay Carman
Attorney, Agent, or Firm—IP Group of Pillsbury Madison & Sutro LLP

[57] ABSTRACT

A group call method, a system controller and a subscriber station in a radio system comprising a plurality of base stations and subscriber stations. In order for a subscriber station to be able to select the group call in which it will participate from among a plurality of group calls while participating in a first group call, group call data are transmitted to the subscriber station during the first group call, by means of which data the subscriber station can engage in another ongoing group call, whereby the subscriber station continues to participate in the first group call or, if it desires, selects another group call from among the group calls whose group call data have been transmitted to the subscriber station and whose group call identifiers are simultaneously displayed on the display of the subscriber station.

21 Claims, 8 Drawing Sheets

D_Late Setup-message 600

| message_id | 601 |
| call_id | 602 |
| Basic_service | 603 |
| calling_party | 604 |
| called_party | 605 |
| physical_ch | 606 |
| slot_nbr | 607 |
| encryption_info | 608 |
| priority | 609 |
| free | 610 |

216 bits

GROUP CALL METHOD, A SYSTEM CONTROLLER AND A SUBSCRIBER STATION IN A RADIO SYSTEM

FIELD OF THE INVENTION

The invention relates to a group call method, a subscriber station and a system controller in a radio system comprising a plurality of base stations and subscriber stations.

BACKGROUND OF THE INVENTION

The method according to the invention is designed particularly for use in so-called trunking networks, which are typically radio networks for companies or authority organizations where all channels are shared by several companies or authority organizations and where the subscribers, in addition to subscriber numbers, have group numbers indicating to which group call group or subscriber group the subscribers belong; thus it is possible to switch calls directed to the members of a certain group to the subscribers of this group.

A group call is one of the key functions in a dedicated radio network. A group call is used in various activities in which several people participate, particularly when a whole group must continuously be aware of the progress of events. A group call is a conference call, in which all participants can in turn talk and listen to each other. In group calls the whole group is called by one radio identity code. An individual radio unit (e.g. a mobile phone), i.e. a subscriber station, may belong to several groups programmed to the radio unit. The system stores a file on the base stations associated with the number of each group. A group call may cover one, several or all base stations in the area of a mobile exchange, or several mobile exchanges. When a group call is established,, all base stations associated with the group call allocate a traffic channel for the group call, and each of these base stations sends a group call request which includes the group number and information on the allocated traffic channel. If the mobile phone identifies the group number included in the group call request, it moves to the traffic channel indicated by the group call request. In principle, a mobile phone can thus always be engaged in a group call if it is located in a predetermined area of operation of the group and if it is not already participating in another group call.

In trunking networks of the prior art, subscribers are not aware of other calls which are ongoing in the location area of the subscriber and in which the subscriber station could participate. Therefore the subscriber station participates merely in one group call, typically the one in which it is first requested to participate, as the subscriber does not know that there are also other ongoing group calls in the location area of the subscriber station in which it could participate.

In prior art systems it has been possible to release the call in which the subscriber has first participated if the system has observed that the subscriber station is wanted to participate in a call with a high priority. A high priority call is a so-called pre-emptive call, typically an emergency call. In such calls, an overriding priority has been used, and the user has not been given a possibility to select the call directly, but the call has been selected on the basis of the system parameterization. When pre-emptive calls are used, a subscriber station cannot select the call that is the most important to it from among the group calls in which it in principle could participate.

A simple prior art solution to this problem of selecting group calls has been that all users of a system have used the same channel. This solution does not, of course, satisfy users of modern trunking networks, or PMR (Private Mobile Radio) networks, as there are many problems pertaining to the use of one channel open to all users owing to the privacy and secrecy requirements set for a private mobile radio system. Thus, as the traffic within organizations has been divided between different channels, the problem caused by the fact that, during a call, the user of a subscriber station does not receive information on other ongoing calls in which the subscriber/subscriber station could participate, still remains unsolved. The subscriber/subscriber station participates therefore almost at random in an allowed group call without having a possibility to affect or prioritize the selection of the call.

BRIEF DESCRIPTION OF THE INVENTION

The object of the present invention is to give a mobile phone subscriber and the subscriber station controlled by him a possibility to select the group call in which the subscriber will participate from among all ongoing group calls in the location area of the subscriber while the subscriber station is simultaneously participating in one of the group calls.

This new type of group call method is achieved with a method according to the invention, which is characterized by the following steps: a subscriber station participates in a first group call; group call data are transmitted to the subscriber station during the first group call to enable the subscriber station to engage in another ongoing group call; the subscriber station continues to participate in the first group call or, if it desires, selects another group call from among the group calls whose group call data have been transmitted to the subscriber station.

The invention further relates to a subscriber station of a radio system, said subscriber station comprising: a receiver-transmitter for establishing a radio link to the radio system, a speech processing and coding unit for processing and coding speech information, a memory unit for storing station and channel identifiers of base stations, a control unit for controlling the subscriber station and its various units, a user interface consisting of a display and a keyboard to enable interaction between the user and the subscriber station. The present subscriber station of a radio system is characterized in that it comprises means for receiving group call data or call information messages and displaying the group call identifiers included therein on the display of the user interface, and that the user interface of the subscriber station comprises selecting-means, by which the user can select the group call in which the subscriber engages from among a plurality of group call identifiers displayed on the display of the user interface.

The invention also relates to a system controller of a radio system, said system controller comprising: an interface unit for transmitting calls and signalling messages to base stations of the radio system, a switching matrix for switching calls between subscriber stations or between subscriber stations and subscribers of a telecommunications network associated with the radio system, a memory means for maintaining data on the subscriber stations and radio resources; a control unit for controlling the switching matrix and the base stations of the radio system. The present system controller of the radio system is characterized in that it further comprises a group call control unit for transmitting group call data or call information messages to subscriber stations during a first group call to enable the subscriber station to engage in another ongoing group call.

The invention is based on the idea that information on other ongoing group calls is transmitted to a subscriber station while the subscriber station is participating in a first group call. The information is transmitted by the use of channel-specific signalling (embedded signalling) associated with the traffic channel allocated for the first group call, i.e. the group call in which the subscriber station is participating. The information can be transmitted using channel-specific signalling associated with a traffic channel in a time-division system, e.g. a TDMA (Time Division Multiple Access) system, or a frequency-division system, e.g. an FDMA (Frequency Division Multiple Access) system. The information is transmitted by a call information message, or a call initiation message, which includes the data the subscriber station needs in order to engage in a new group call. These data are stored in the memory of the subscriber station, and the display of the user interface in the subscriber station shows the identifier of the group call to which the call information message relates. By means of the group call identifier the user can select this group call, using the keyboard of the user interface, whereby the subscriber station automatically moves to this group call and the subscriber may participate in the call.

The advantage of the group call method, the system controller and the subscriber station according to the present invention is that the user of the subscriber station himself may prioritize the group calls in which he may participate. From the display of his subscriber station, i.e. mobile phone, the user can see in which group calls the subscriber station may participate. The user selects the group call in which he wishes to participate by means of the keyboard of the user interface. A further advantage of the invention is that the user is continuously aware of the group calls in which he could participate, and in addition, the user may monitor the frequency of occurrence of each of these group calls.

BRIEF DESCRIPTION OF THE FIGURES

In the following, the invention will be described in greater detail with reference to the accompanying drawings, in which.

DETAILED DESCRIPTION OF THE INVENTION

Figure 1:
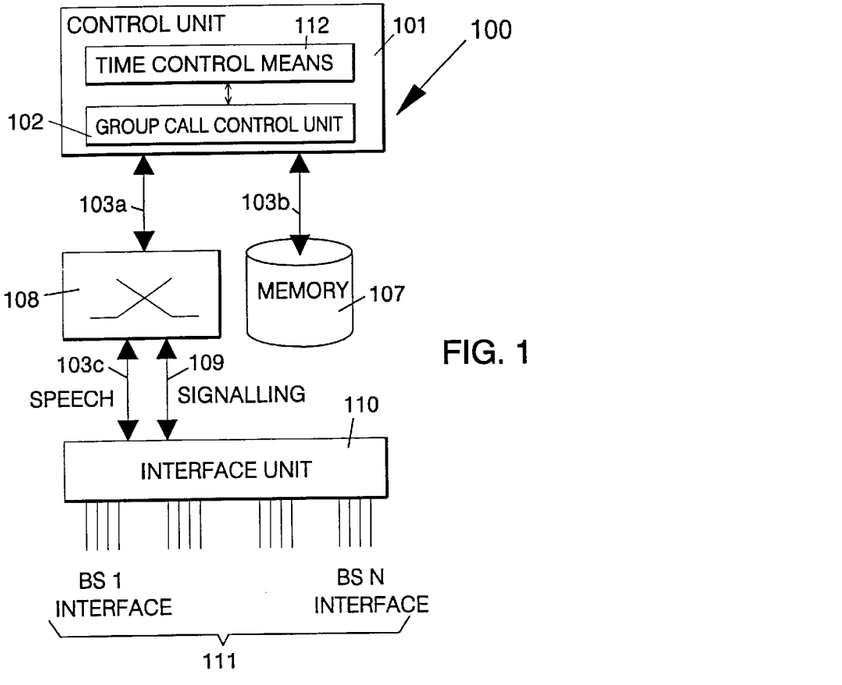
FIG. 1 shows a system controller of the invention, typically a mobile exchange.

FIG. 1 shows the system controller 100 of a radio system, typically a mobile exchange. The system controller 100 is connected to base stations BS1-BSN of the radio system via interfaces 111. The interfaces 111 are connected to an interface unit 110, which in turn is connected to a switching matrix 108 via an information bus 103c, which carries speech, and a bus 109 which carries signalling messages. The switching matrix connects the desired logical channels, typically subscribers, together. The subscribers may be subscribers of either merely this mobile radio network or also some other telecommunications network. The switching matrix is further connected to the control unit 101 of the system controller 100 via a bus 103a. The control unit 101 is further connected to a memory 107 via a bus 103b. The memory 107 stores data on the subscribers and radio resources of the radio system, and on calls and group calls.

The control unit 101 of the system controller 100 according to the invention comprises a group call control unit 102 for transmitting group call data or call information messages (D_late_setup) according to the invention to base stations BS1-BSN to be further transmitted to subscriber stations. The control unit 101 further comprises time control means 112, such as a period counter, which instruct the group call control unit to transmit group call data or call information messages at desired intervals, for example at predetermined intervals, to base stations BSl-BSN to be further transmitted to the subscriber stations engaged is in the group calls.

Figure 2:
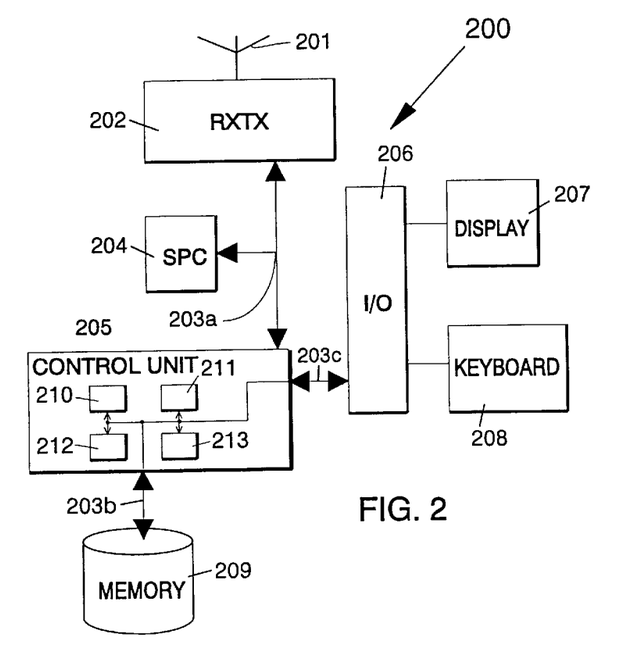
FIG. 2 shows a subscriber station of the invention.

FIG. 2 shows a subscriber station 200 according to the invention. The subscriber station may be a mobile phone or some other radio terminal, e.g. a portable phone. The subscriber station 200 is connected to the radio system or mobile phone system via a radio path and an antenna 201 connected with it. The antenna 201 is connected to a receiver-transmitter unit RXTX 202, which enables, communication between the subscriber station and the radio system by being in radio connection with the base stations BS1-BSN. The receiver-transmitter unit RXTX 202 is connected via a bus 203a to a speech processing and coding unit SPC 204, which processes and codes speech and signalling information. The receiver-transmitter unit RXTX 202 is also connected via the bus 203a to a control unit 205 of the subscriber station 200, which controls the subscriber station and its different units. The control unit 205 is further connected via-a-bus 203b to a memory 209, which stores station and channel identifiers of the base stations BS1-BSN and, in the case of the subscriber station 200 of the invention, also the identifiers and participation information of the group calls in which the subscriber station 200 may participate. Via a bus 203c the control unit 205 is further connected to an input/output unit I/O 206, which in turn is connected to the user interface of the subscriber station 200, the user interface comprising a key-board 208 and a display 207. The user interface according to the invention is described more closely in FIG. 3. The user interface enables interaction between the subscriber station and its user.

The control unit 205 of the subscriber station 200 further comprises means 210 for receiving group call data or call information messages sent by the system is controller and for transmitting the group call identifiers included therein to the display of the user interface and for storing these group call data in the memory 209 of the subscriber station.

The control unit is further provided with means 211 which, responsive to the priority data received by the subscriber station, for instructing the subscriber station to engage in the group call the call, information message relating to which contains the highest priority. The highest priority may be an overriding priority, which compels the subscriber station to participate in a certain group call whenever the overriding priority is received, or it may be simply the highest one of all the priorities included in the call information messages received by the subscriber station.

In addition, the control unit comprises means 212 for transmitting an acknowledgement to the radio system, typically to its system controller (FIG. 1). The acknowledgement which indicates that the subscriber station 200 has started to participate in a certain group call, i.e. it informs of the selection of a group call made by the user. The acknowledgement may inform the system controller that the subscriber station 200 no longer participates in a certain group call or that it has become engaged in a new group call, indicating at the same time the identifier of the new group call.

The control unit 205 of the subscriber station 200 of the invention is also provided with means 213 for removing the identifiers of the group calls that have been released from the display 207 of the subscriber station. When group calls are released, the subscriber station receives a group call release message, and responsive to this message, the corresponding group call identifier is removed from the display 207 of the subscriber station 200.

Figure 3:
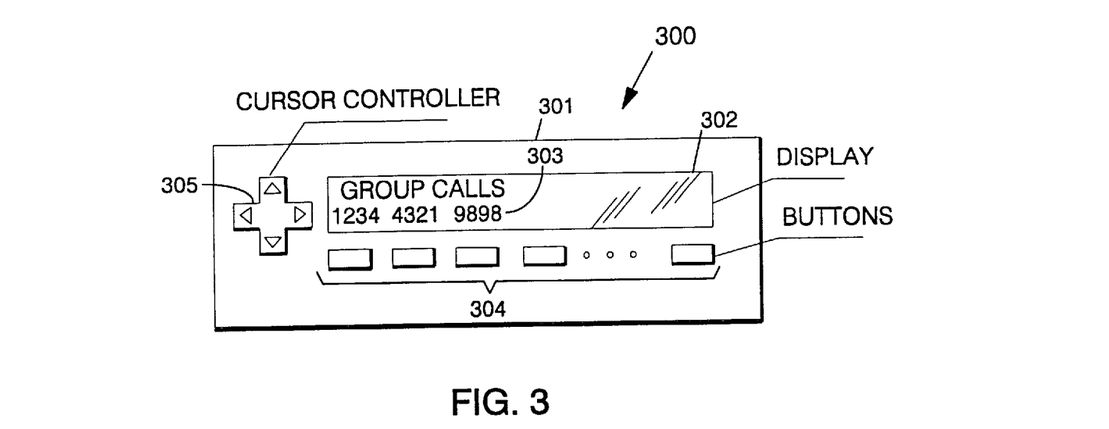
FIG. 3 shows the user interface of a subscriber station of the invention.

FIG. 3 illustrates the user interface 300 of a subscriber station 200 according to the invention. FIG. 3 shows the visible parts of the user interface, i.e. a front panel 301 of the subscriber station, or mobile phone, in which the essential features of the invention can be seen. The user interface comprises a display 302, which shows the identifiers 303 of the group calls in which the subscriber station 200 may participate. Of the group calls displayed, the user of the subscriber station may select the one he wishes to listen to and participate in by pressing one of the buttons 304, each of which stands for a given group call. According to another embodiment, the desired group call is selected by means of a cursor controller 305, by which the user scrolls the cursor to indicate the identifier of the group call in which he wishes to participate.

Figure 4:
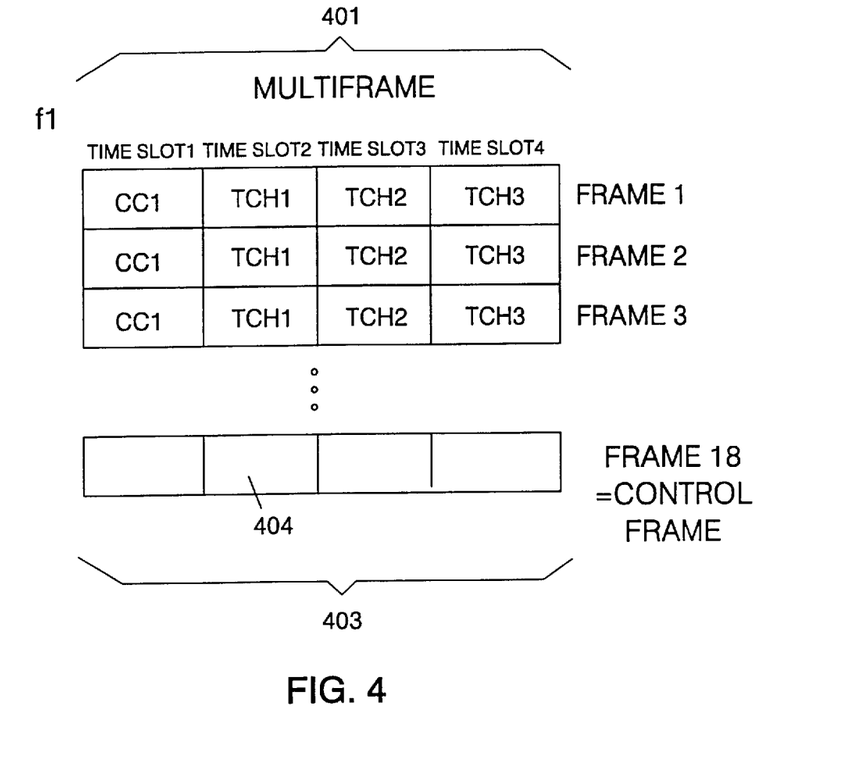
FIG. 4 shows a multiframe structure of a TDMA system used in an embodiment of the invention.
Figure 5:
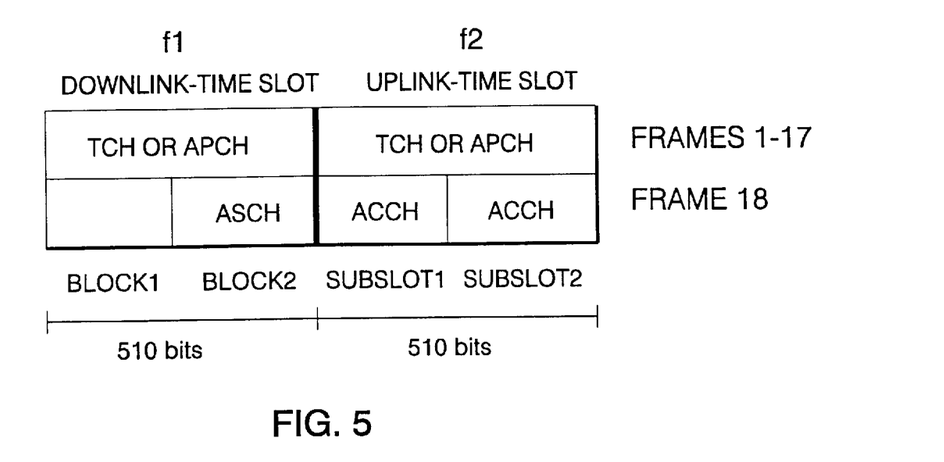
FIG. 5 shows an example of the logical channels contained in a time slot converted to a traffic channel in a TDMA system.

FIG. 4 shows a multiframe structure of a TDMA system. One carrier frequency f1 may have, for example, four channels, of which one, in this case the first one, is a signalling channel CC1 and the others are traffic channels TCH1, TCH2, TCH3, each of the channels being located in its own time slot (time slots 1–4). These four successive time slots form a frame 401. Eighteen successive frames form a multiframe. Any one of the time slots may be a signalling time slot, but in this case time slot 1 is considered a signalling time slot, i.e. control channel. The first seventeen frames (frames 1–17) of the other time slots 2–4 are allocated to traffic channels, and the following frame (frame 18) is a control frame, containing the inband signalling channels 403 associated with these traffic channels. In FIG. 5, time slot 2, 404 (FIG. 4), of the control frame is shown in greater detail by way of example. In the method according to the invention this time slot is used for transmitting data on the existence of a certain group call within the coverage area of certain base stations. This group call data contains several pieces of information, which are described more closely in connection with FIG. 6.

FIG. 5 shows an example of the logical channels contained in one time slot converted to a traffic channel in a TDMA system. The figure illustrates frames 1 to 17, which are used as traffic channels, and frame 18, i.e. the control frame, which is used for transmitting control information. The figure also illustrates time slot 2, 404, of the control frame, shown in FIG. 4. In the case of FIG. 5, a downlink time slot, i.e. information from a base station to a subscriber station, is transmitted at a frequency f1, and an uplink time slot, i.e. information from a subscriber station 200 to a base station BS1-BSN, is transmitted at a frequency f2. It can be seen from FIG. 4 that each time slot first has frames 1 to 17, in which time slots 2 to 4 serve as traffic channels and time slot 1 as a signalling channel CC1. In frame 18, or the control frame, each time slot is divided into subslots or blocks. Block 2, for example, contains an associated signalling channel ASCH; in this subslot, e.g. traffic channel-specific signalling can be transmitted. In the method according to the present invention, this subslot is used for transmitting information on the existence of a certain group call within the coverage area of certain base stations. This group call data contains several pieces of information, which are described more closely in connection with FIG. 6. This traffic channel-specific signalling channel can further be used for transmitting acknowledgements and group call disconnect messages sent by subscriber stations; both of these messages are described in greater detail in connection with FIG. 7. Instead of an ASCH, all of these messages and other signalling can be transmitted on a so-called associated pre-emptive control channel APCH; in practice, this means that these data are transmitted in a speech frame of a time slot of a speech channel, e.g. in frame 17 of FIG. 4. The desired signalling messages can thus be rapidly transmitted.

Figure 6:
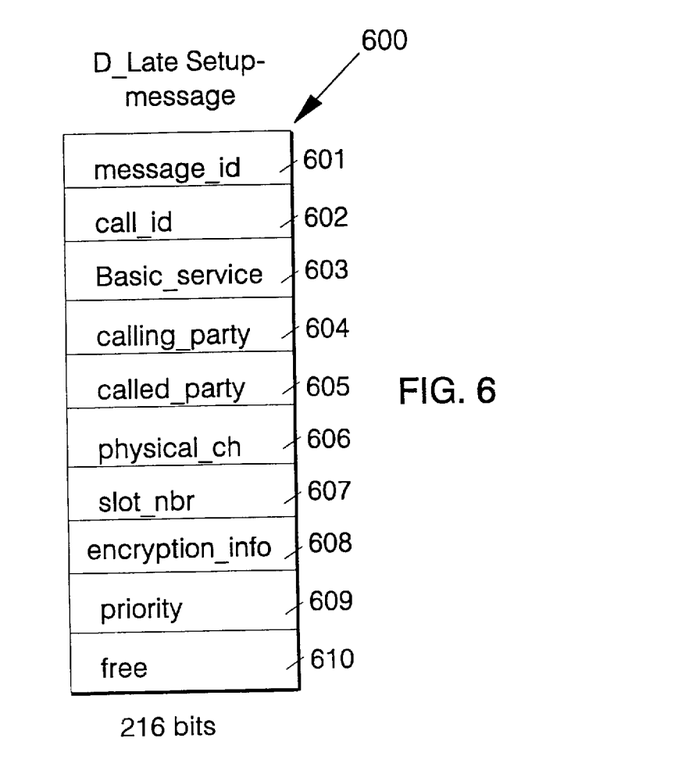
FIG. 6 shows an example of group call data according to the invention, transmitted as a call information message.

FIG. 6 shows an example of the group call data according to the invention, which is transmitted as a call information message 600. The group call data is typically sent as a call information message (D_late_setup), which is divided into fields, each of the fields corresponding with one of the pieces of information which together form the group call data. The order of the fields in the message can be freely selected; the figure illustrates one suitable order.

The first field 601 contains the identifier of the message, typically a number. The message identifier field is message_id. The second field 602 contains the identifier of each call or group call, call_id, for example a number. The group call identifier renders possible the call control in a radio system. Two calls cannot be simultaneously provided with the same identifier in a mobile phone network.

The third field 603, basic_service, defines the type of basic service. Individual call, group call, acknowledged group call and broadcast call are examples of basic services.

The fourth field 604, calling_party, contains the identifier of the calling party, or A-subscriber; this identifier is usually formed from the telephone number. The fifth field 605, called_party, defines the called party, which may be either an individual subscriber or a group of subscribers.

The sixth field 606, physical_ch, contains the number of the physical channel which carries the ongoing group call to which the call information message relates. The physical channel number corresponds to the physical frequency at, which the group call is transmitted.

The seventh field 607, slot_nbr, defines the time slot in which the logical channel of the call is located.

The eighth field, 608, encryption_info, indicates the encryption method that is used and/or the method for obtaining the encryption key.

The ninth field 609, priority, indicates the priority of the group call. The priority may be based on the call type, on the priority of the group or the calling party, or on some other data. A subscriber station may be compelled to participate in a call which has the highest priority of all the group calls whose data the subscriber station has received, i.e. the group calls in which the subscriber station is allowed to participate, or in a call with an overriding priority. The last field 610 of the message is free.

Figure 7:
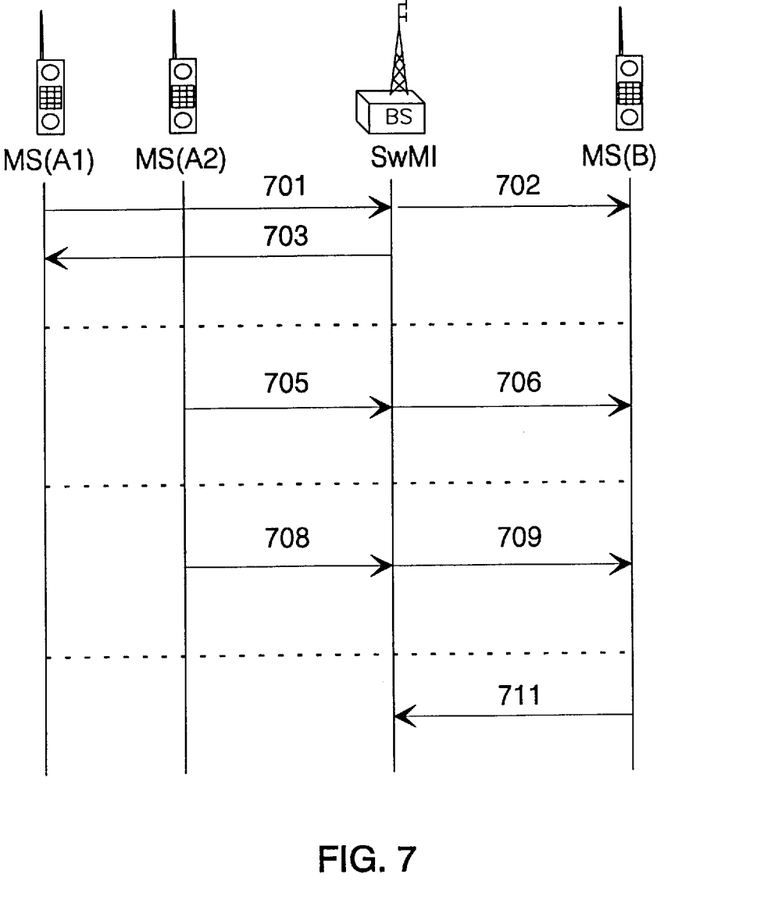
FIG. 7 is a signalling and event diagram depicting the operation of the method according to the invention.

FIG. 7 is a signalling and event diagram depicting the operation of the method according to the invention. At the top of the figure there are illustrated subscriber stations MS (A1), MS (A2) and MS (B) and a base station BS connected with the switching and management infrastructure SwMI. In the following, the establishment of a normal, unacknowledged group call on a radio path will be described. The subscriber station MS (A1) selects the number of the group call group to which the subscriber MS(B) belongs. The selected number is transmitted in a call set-up message 701 to the SwMI, which sets up the call by transmitting a call set-up is message 702 to the B-subscriber, i.e. the subscriber station MS(B). This exchange of messages takes place on the main control channel of the base station BS. A group call is thus established between the subscriber stations MS (A1) and MS (B). After the system has established the group call, it sends an acknowledgement 703 to the A-subscriber.

The operation of the group call method of the invention in practice will be described in the following. When the A-subscriber wishes to start a group call using the method of the invention, it, in this case the subscriber station MS (A2), sends a group call set-up request 705 to the SwMI. The radio system exchange sends then, through base stations BS, a call information message 706 according to the invention (described more closely in connection with FIG. 6) to the 3-subscriber MS(B), which may thereafter select the group call established by the A-subscriber as the group call in which it participates. If the B-subscriber selects the group call established by the A-subscriber, and the group call indicated by the call information message is an acknowledged group call in its basic type, the B-subscriber sends an acknowledgement, e.g. a u_present message, according to the prior art when selecting this group call in order to inform the A-subscriber and the system of his engagement in the group call. correspondingly, if the B-subscriber disengages from an acknowledged group call, it sends to the system a u_disconnect message to inform the system that it is disconnected from the group call. Both of these messages are transmitted from the B-subscriber to the system via a traffic channel-specific signalling channel.

Further in accordance with the invention, when the A-subscriber wishes to release a group call, it sends to the system a call disconnect message, u_disconnect 708. Responsive to the call disconnect message, the system, typically its exchange or system controller, sends a call release message, d_release 709, to all the group call channels to which it has previously sent call information messages, i.e. to those B-subscribers which could have participated in the group call. Both of these messages are transmitted on a traffic channel-specific signalling channel, which in a TDMA system is an associated control channel ACCH. An FDMA system uses so-called embedded signalling.

In accordance with the invention, if an acknowledged group call is concerned, and the B-subscriber selects another group call while participating in this group call, it sends to the system a notification message 711 concerning the change of channels, whereby the system and, if necessary, each subscriber station that has started a group call, i.e. A-subscriber, knows which B-subscriber is participating in the group call concerned.

Figure 8:
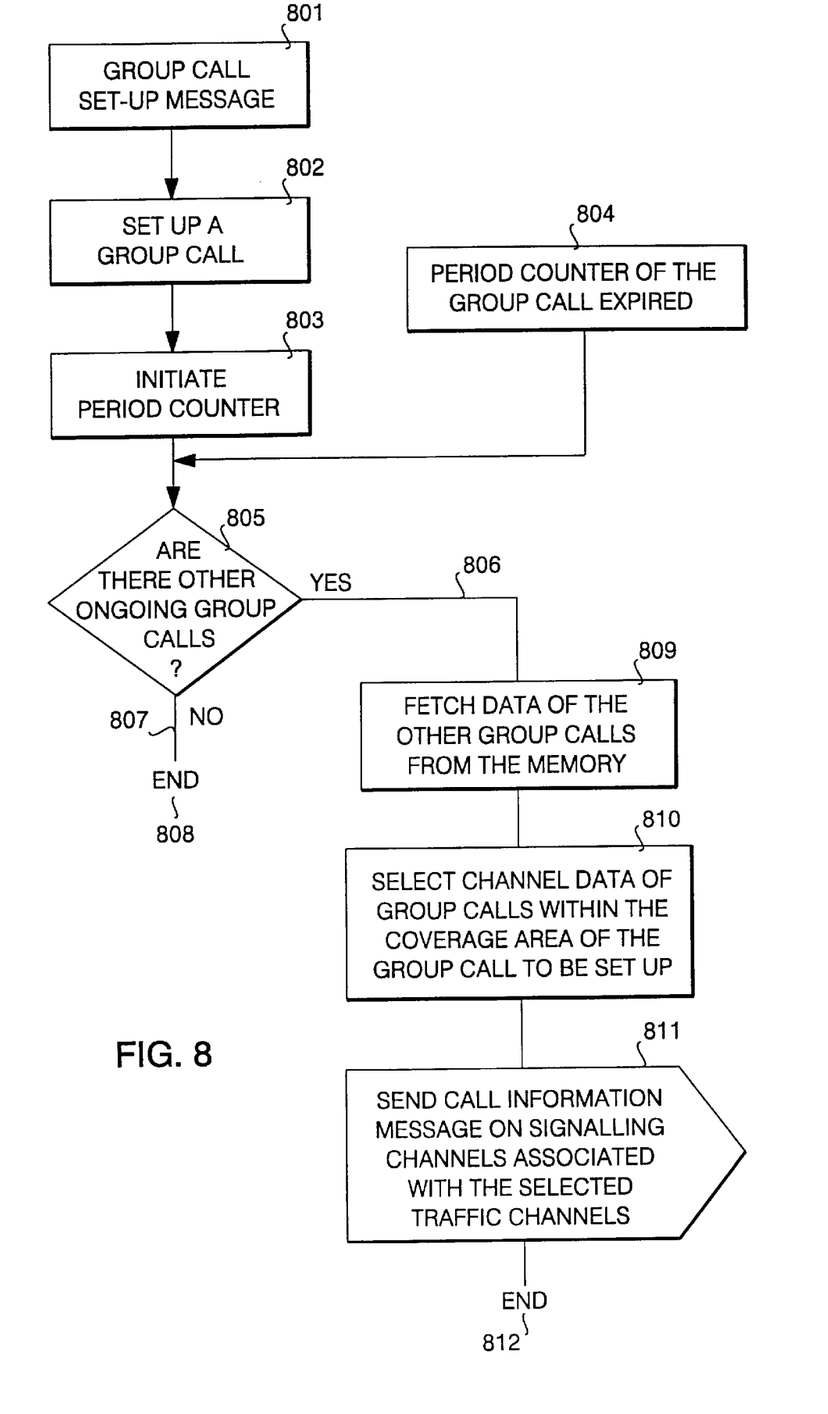
FIG. 8 is a flow diagram depicting the operation of the group call controller of the system controller shown in FIG. 1, in accordance with the invention.

FIG. 8 is a flow diagram depicting the operation of the group call controller of the system controller shown in FIG. 1, in accordance with the invention. The establishment of a group call starts when a subscriber station sends 801 a group call set-up message to the system controller, i.e. the exchange, where it is switched to the group call control unit of the exchange (FIG. 1, 102). Thereafter the group call control unit sets up the group call 802 by searching the memory for the data necessary for setting up the group call and, on the basis of the data found in the memory, sending group call set-up messages to the correct base stations and through them to the correct subscriber stations. Thereafter the group call control unit instructs the switching matrix (FIG. 1, 108) to connect the desired channels together. Finally the system acknowledges the establishment of the group call to the A-subscriber by sending an acknowledgement. Simultaneously a period counter, i.e. the time control means 112 of the control unit in FIG. 1, is initiated 803 in order to measure the time from the latest transmission of the call information message. Thereafter it is checked 805 whether there are other ongoing group calls; if not, 807, the operation of the group call control unit pertaining to this group call is ended 808. If it is observed that there are also other ongoing group calls 806, the memory (FIG. 1, 107) is searched for the data of these group calls 809; on the basis of these data, call information messages relating to the group call to be established are sent to the subscribers which are entitled to participate in the group call to be established. The channel data of the group calls that exist within the coverage area of the group call to be established are selected 810 from among these data. By means of this channel data a call information message is sent 811 on signalling channels associated with the selected traffic channels. The call information message is sent from the group call control unit through the switching matrix (FIG. 1, 108) and the interface unit (FIG. 1, 110) of the system controller to the base stations (FIG. 1, BS1-BSN) which transmit the messages via a radio path to the subscriber stations (FIG. 2, 200). Thereafter the routine is ended 812. It should be noted that call information messages can be transmitted automatically, for instance in such a manner that whenever the period counter, or time control means 112, of a group call has expired, a new call information message is sent, and the time control is initiated again. In this way call information messages can also be sent to subscriber stations that have roamed into the coverage area of the group call in question only after the group call has been established and the call information message relating to it has been sent. In this case, when the period counter, or time control means 112, of the group call expires 804, the routine continues following the steps described above.

Figure 9:
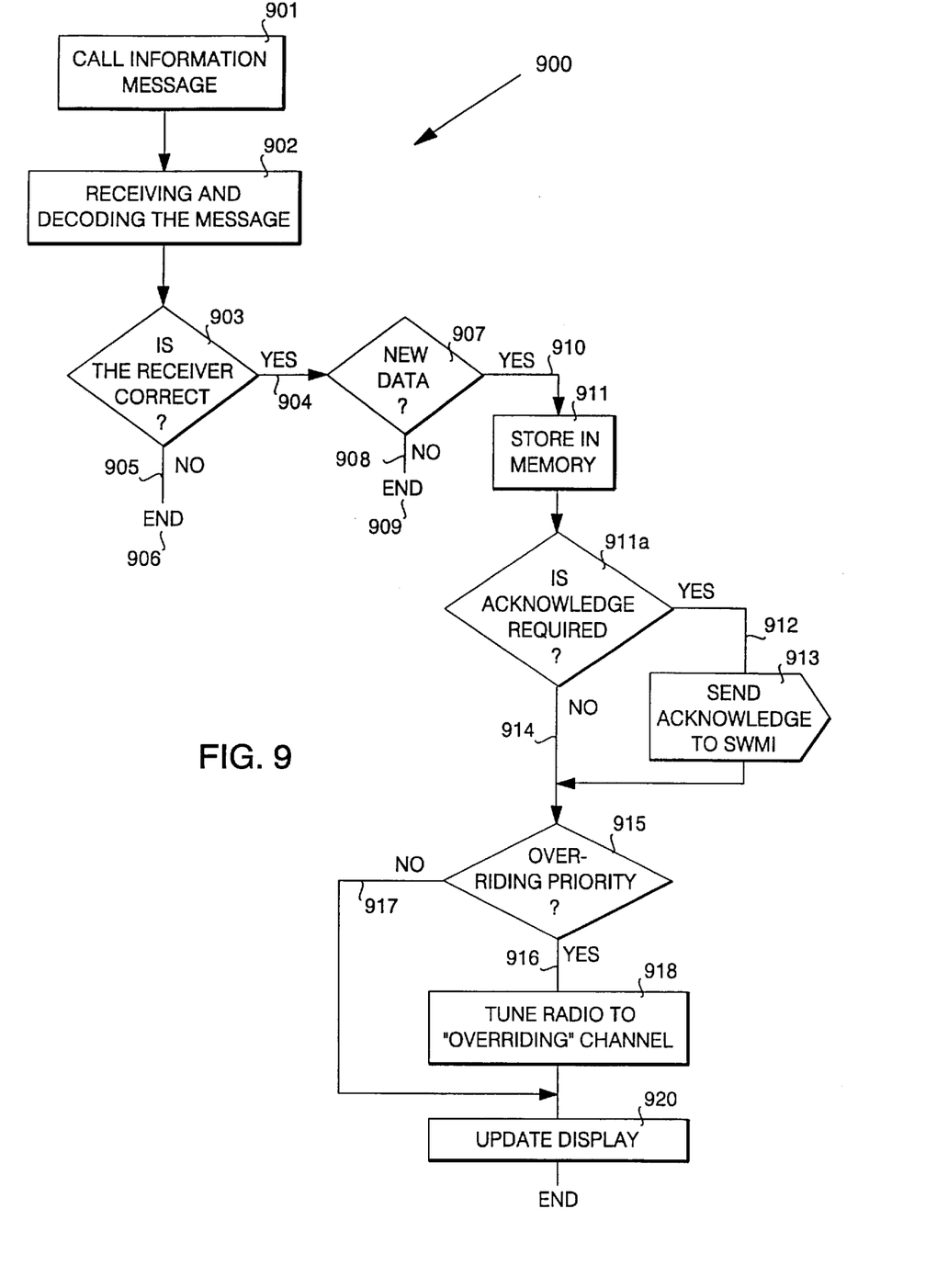
FIG. 9 is a flow diagram depicting the operation of the control unit of the subscriber station shown in FIG. 2 upon receipt of a call information message, in accordance with the invention.

FIG. 9 is a flow diagram 900 depicting the operation of the control unit 205 of the subscriber station 200 shown in FIG. 2 when it receives a call information message. Upon receipt 901, 902 of a call information message (D_late_setup)—the contents of which are described in connection with FIG. 6 and the transmission of which is described in connection with FIG. 8—the subscriber station decodes 902 the message. Thereafter it is examined 903 to determine whether the call information message has been sent to the correct subscriber station; if not 905, the processing of the message at the subscriber station is ended 906. If the call information message (D_late_setup) has been received 904 by the correct subscriber station, it is examined 907 to determine whether the data contained in the call information message are new; if not 908, the processing of the message at the subscriber station is ended 909. If the call information message is new 910, the data contained in it are stored 911 in the memory (FIG. 2, 209). Thereafter it is examined 911a to determine whether the message relates to a group call service which is to be acknowledged or not. If it relates to a group call to be acknowledged 912, an acknowledgement is sent 913 to the mobile phone system, or SwMI. If it does not relate to a group call to be acknowledged, the routine is continued 914 without an acknowledgement. Thereafter it is examined 915 to determine whether the group call to which the call information message relates has a so-called overriding priority; in other words, should the subscriber station tune itself to a certain group call channel without the user making the selection. In the case of an overriding is priority 916, the subscriber station tunes 918 its radio to listen to that channel. If an overriding priority is not concerned 917, the display is updated 920 in the same way as when the radio has been tuned 918 to a new channel on account of an overriding priority. When the display is updated 920, the identifier of the group call to which the received call information message (D_late_setup) relates is displayed on the display (FIG. 3, 303) of the user interface of the subscriber station. In the case of a normal group call, the user of the subscriber station may select the group call in which he participates by using a cursor (FIG. 3, 305) or possible selecting buttons (FIG. 3, 304). In the case of an overriding group call, i.e. a group call provided with an overriding priority, it is merely shown on the display that the group call that is listened to has been changed, and the data on the new group call are also shown. There may naturally be several kinds of priorities, and according to an embodiment of the invention, the receiver-transmitter of the subscriber station tunes itself to listening to the group call that has the highest priority.

Figure 10:
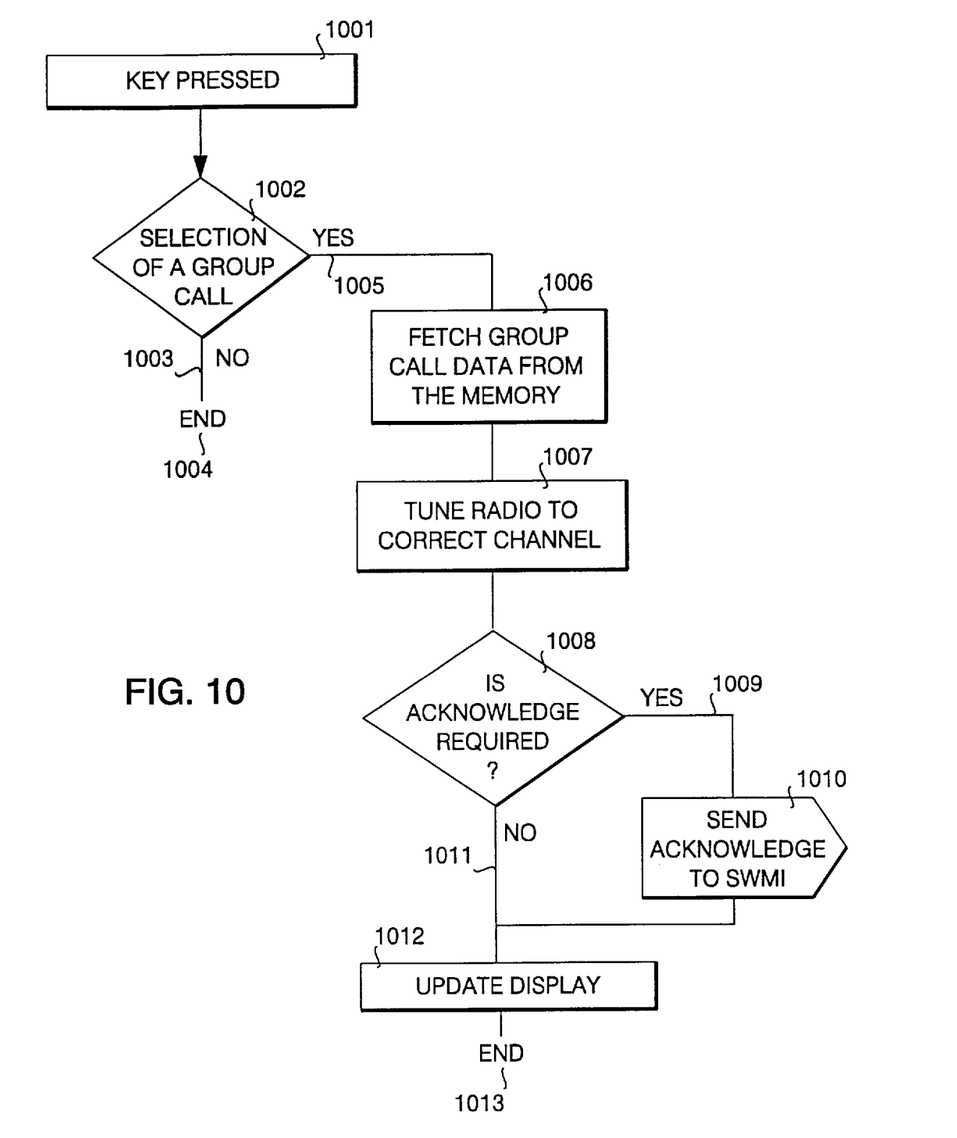
FIG. 10 is a flow diagram depicting the operation of the control unit of the subscriber station shown in FIG. 2 when the subscriber station is selecting a group call, in accordance with the invention.

FIG. 10 is a flow diagram depicting the operation of the control unit of the subscriber station shown in FIG. 2 when the subscriber station is selecting a group call, in accordance with the invention. The control unit 205 observes 1001 that a group call selecting button (FIG. 3, 304) of the keyboard 208 of the user interface at the subscriber station 200 has been pressed. The control unit examines 1002 whether the button has been pressed in order for a group call to be selected; if not 1003, the routine is ended 1004. If the button was pressed in order for a group call to be selected 1005, the memory 209 is searched through 1006 for the group call data, and the radio unit, i.e. the receiver-transmitter unit RXTX 202, is tuned 1007 to the correct channel. Thereafter it is examined 1008 whether an acknowledgement is required concerning the change of channels, i.e. whether the group calls to which the change of channels relates are group calls that are to be acknowledged. If an acknowledgement is required 1009, an appropriate acknowledgement 1010 is sent to the system, or SwMI. The acknowledgement may contain the identifier of the group call from which the subscriber station has disengaged or that of the group call to which it has engaged. Thereafter the display 207 is updated 1012. Accordingly, in the case of a group call which does not have to be acknowledged 1011, the method proceeds directly to updating the display 207, whereafter the routine is ended 1013.

Figure 11:
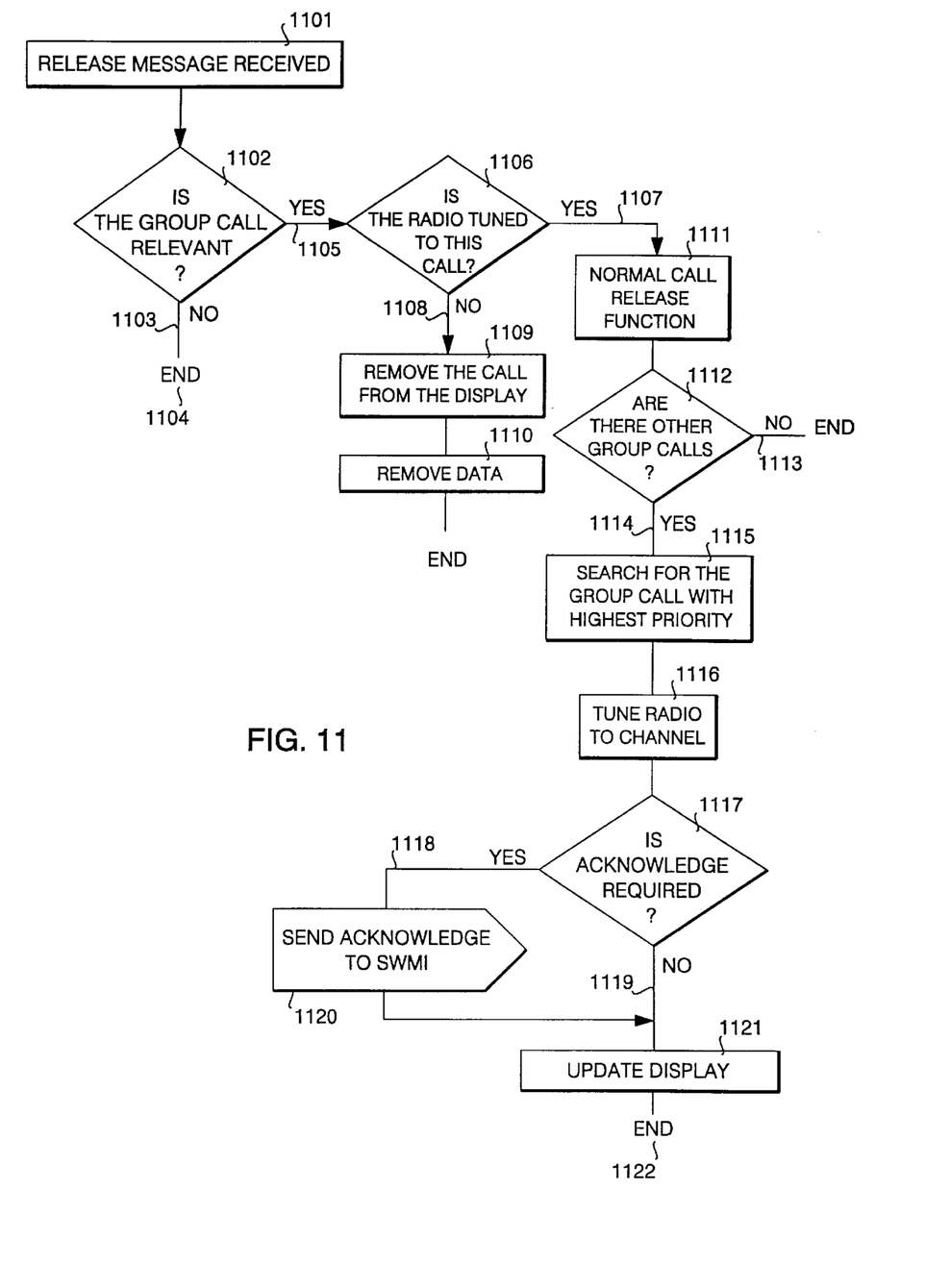
FIG. 11 is a flow diagram depicting the operation of the control unit of the subscriber station shown in FIG. 2 upon receipt of a group call release message, in accordance with the invention.

FIG. 11 is a flow diagram depicting the operation of the control unit of the subscriber station shown in FIG. 2 when the subscriber station 200 receives 1101 a group call release message, in accordance with the invention. In this case it is examined 1102 whether the received release message relates to a group call in which the subscriber station in question is engaged or could have been engaged. If not 1103, the processing of the release message at the subscriber station is ended 1104. If the release message is relevant 1105 to the subscriber station, it is subsequently examined 1106 to determine whether the radio, or the receiver-transmitter 202, is tuned to this call. If the receiver-transmitter is not tuned 1108 to this call, the identifier of the group call indicated by the release message is removed 1109 from the display, and the corresponding data are removed 1110 from the memory. Thereafter the processing of the release message is ended. If the radio, or the receiver-transmitter 202, is tuned 1107 to this group call, a normal call release function 1111 is effected, whereafter it is checked 1112 whether the subscriber station in question can engage in another group call. If not 1113, the processing of the received group call message is ended. If the same subscriber station may participate 1114 in another group call other than the one to which the received release message relates, these other group calls are searched 1115 for the group call having the highest priority, and the receiver-transmitter of the subscriber station is tuned 1116 to a channel associated with this group call. Thereafter it is examined 1117 whether the group call in question requires an acknowledgement; if it does 1118, an acknowledgement is sent 1120 to the system, i.e. the SwMI is informed that the subscriber station has engaged in a new group call. Accordingly, if no acknowledgement is required 1119, the method proceeds directly to updating the display 1121 in the same manner as after step 1118. The display of the subscriber station is updated in such a manner that the identifier of the old group call is removed and that of the group call in which the subscriber station has started to participate is indicated in some way so that the user of the subscriber station knows in which group call the subscriber station is currently engaged. Thereafter the routine is ended 1122.

Figure 12:
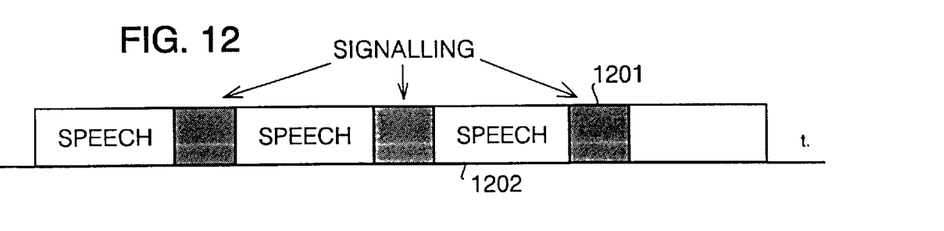
FIG. 12 illustrates a way of transmitting a call information message according to the invention by the use of an inband signalling channel associated with a traffic channel in an FDMA system.

FIG. 12 illustrates a way of transmitting a call information message according to the invention by the use of an inband signalling channel associated with a traffic channel in a frequency-division system, e.g. an FDMA system; channel-specific signalling is implemented in each time slot of the frequency-divided traffic channels. The information to be transmitted at a certain frequency is time-divided in such a manner that speech 1202 (SPEECH) is transmitted in one period of time and signalling 1201 (SIGNALLING) in another. The signalling may be, for example, a call information message, which is described in connection with FIG. 6.

The drawings and the description relating thereto are intended merely to illustrate the inventive concept. In their details, the group call method, system controller and subscriber station according to the present invention may be modified within the scope of the appended claims. Although the invention has been described above mainly in connection with PMR systems, it can also be used in other telecommunications systems.

I claim:

1. A group call method in a radio system comprising a plurality of base stations and subscriber stations, the group call method comprising:

transmitting group call data to a subscriber station participating in a first ongoing group call to enable the subscriber station to engage in a second ongoing group call; and performing one of continuing participation of the subscriber station in the first ongoing group call and selecting the second ongoing group call from among a plurality of group calls corresponding to the group call data transmitted to the subscriber station.

2. A group call method according to claim 1, wherein the group call data includes a priority of a group call, and the subscriber station engages in a group call having a highest priority.

3. A group call method according to claim 1, wherein the group call data which enable the subscriber station to engage in the second ongoing group call are transmitted to the subscriber station on an inband signalling channel associated with a traffic channel of the first ongoing group call.

4. A method according to claim 3, wherein the group call data which enable the subscriber station to engage in the second ongoing group call are transmitted to the subscriber station on a channel-specific signalling channel implemented in a time slot of frequency-divided traffic channels.

5. A group call method according to claim 3, wherein the group call data which enable the subscriber station to engage in the second ongoing group call are transmitted to the subscriber station in a time slot corresponding to the traffic channel of the first ongoing group call by using channel-specific signalling.

6. A group call method according to claim 1, wherein the group call data which enable the subscriber station to engage in the second ongoing group call are transmitted to the subscriber station as a call information message, the call information message comprising:

an identifier of the call information message;

an identifier of a group call group;

a channel number corresponding to a physical frequency of a traffic channel on which the second group call is ongoing within a coverage area of a base station that sent the call information message, and a logical channel number of the traffic channel on which the second group call is ongoing.

7. A group call method according to claim 6, wherein the group call data transmitted to the subscriber station in the call information message further comprise a definition of a basic service type.

8. A subscriber station of a radio system, comprising:

a receiver-transmitter for establishing a radio link to the radio system;

a memory unit for storing station and channel identifiers of base stations;

a control unit for controlling the subscriber station and various units of the subscriber station;

a user interface comprising a display and a keyboard to enable interaction between a user and the subscriber station;

means for receiving group call data including a plurality of group call identifiers and for displaying the plurality of group call identifiers on the display of the user interface; and selecting means, by which the user can select a group call in which the subscriber station will engage from among the plurality of group call identifiers displayed on the display of the user interface.

9. A subscriber station according to claim 8, further comprising means responsive to priority data included in the group call data received by the subscriber station, for causing the subscriber station to engage in a group call corresponding to the priority data having a highest priority.

10. A subscriber station according to claim 8, comprising means for transmitting to the radio system an acknowledgment informing the radio system of an automatic selection of a call made by the subscriber station based on one of a high priority and an overriding priority.

11. A subscriber station according to claim 8, comprising means, responsive to a release message sent by a system controller of the radio system and comprising a group call identifier, for removing the group call identifier from the display of the user interface.

12. A system controller of a radio system, said system controller comprising:

an interface unit for transmitting calls and signalling messages to base stations of the radio system;

a switching matrix for switching calls between subscriber stations or between subscriber stations and subscribers of a telecommunications network associated with the radio system;

memory means for maintaining data on the subscriber stations, radio resources and ongoing group calls;

a control unit for controlling the switching matrix and the base stations of the radio system;

a group call control unit for checking whether there is a plurality of ongoing group calls in the radio system and, in response to the checking, if there is a plurality of ongoing group calls, for transmitting group call data or call information messages to the subscriber stations during a first ongoing group call to enable at least one of the subscriber stations to engage in a second ongoing group call.

13. A system controller according to claim 12, wherein the group call control unit is connected to time control means for controlling that the group call data or the call information messages are transmitted at desired points of time.

14. A group call method according to claim 11, further comprising:

displaying identifiers, included in the group call data received by the subscriber station, to a user via a user interface of the subscriber station, the identifiers indicating ones of the plurality of group calls in which the subscriber station may participate; and selecting, by using the user interface, a group call in which the subscriber station will participate from among the ones of the plurality of group calls.

15. A group call method according to claim 1, further comprising:

transmitting a release message to the subscriber station indicating one of the plurality of group calls to be released; and removing an identifier, corresponding to the one of the plurality of group calls, from a user interface display of the subscriber station, the user interface display displaying ones of the group calls in which the subscriber station may participate.

16. A group call method according to claim 14, further comprising:

selecting a new group call of the ones of the plurality of group calls via the user interface causing the subscriber station to disengage the group call in which the subscriber station was participating; and after selecting the new group call, sending an acknowledgment to the radio system from the subscriber station informing the radio system that the subscriber station is engaging in the new group call.

17. A group call method according to claim 14, further comprising:

selecting a new group call of the ones of the plurality of group calls via the user interface causing the subscriber station to disengage the group call in which the subscriber station was participating; and after selecting the new group call, sending an acknowledgment to the radio system from the subscriber station informing the radio system that the subscriber station is engaging in the new group call and simultaneously informing a system controller within the radio system of an identifier corresponding to the new group call.

18. A system controller according to claim 12, wherein the group call data or the call information messages are transmitted to the subscriber stations on an inband signalling channel associated with a traffic channel of the first group call.

19. A system controller according to claim 18, wherein the group call data or the call information messages are transmitted to the subscriber sections on a channel-specific signalling channel implemented in a time slot of frequency-divided traffic channels.

20. A system controller according to claim 18, wherein the group call data or the call information messages are transmitted to the subscriber station in a time slot corresponding to the traffic channel of the first group call by using channel-specific signalling.

21. A group call method according to claim 2, wherein the group call data which enable the subscriber station to engage in the second ongoing group call are transmitted to the subscriber station on an inband signalling channel associated with a traffic channel of the first ongoing group call.

* * * * *